(12) United States Patent
Ono

(10) Patent No.: US 6,744,003 B1
(45) Date of Patent: Jun. 1, 2004

(54) AUTOMATIC SOLDERING MACHINE

(76) Inventor: Harry Ono, 1890 Big Ben Dr., Des Plaines, IL (US) 60016

( * ) Notice: Subject to any disclaimer, the term of this patent is extended or adjusted under 35 U.S.C. 154(b) by 0 days.

(21) Appl. No.: 09/918,238

(22) Filed: Jul. 30, 2001

(51) Int. Cl.⁷ ................................................ B23K 3/00
(52) U.S. Cl. ............................... 219/85.16; 219/85.19; 228/33
(58) Field of Search .................... 219/228, 221, 219/243, 245, 85.19, 85.15, 85.16; 228/1.1

(56) References Cited

U.S. PATENT DOCUMENTS

| | | | |
|---|---|---|---|
| 3,652,819 A | * | 3/1972 | Kerr et al. .................. 219/85.1 |
| 4,212,265 A | * | 7/1980 | Buxton ........................ 118/700 |
| 4,560,100 A | * | 12/1985 | Hall ............................. 228/40 |
| 4,588,468 A | * | 5/1986 | McGinty et al. .......... 156/345.1 |
| 4,832,246 A | * | 5/1989 | Ono et al. ..................... 228/1.1 |
| 5,042,708 A | * | 8/1991 | Ledermann et al. ........... 228/55 |
| 5,421,505 A | * | 6/1995 | Hild, II ........................ 228/41 |
| 5,519,192 A | * | 5/1996 | Childs et al. ................ 219/616 |
| 5,813,591 A | * | 9/1998 | Quinn et al. .................. 228/41 |
| 6,273,358 B1 | * | 8/2001 | Hileman .................. 242/564.4 |

FOREIGN PATENT DOCUMENTS

JP          63-63569 A  *  3/1988

* cited by examiner

*Primary Examiner*—Tom Dunn
*Assistant Examiner*—Kevin L. McHenry
(74) *Attorney, Agent, or Firm*—Pauley Petersen & Erickson

(57) ABSTRACT

An automatic soldering machine utilizing many design features which substantially reduces maintenance, simplifies the soldering operation, improves the process reliability, reduces the cycle time, and reduces the cost to fabricate such a machine.

9 Claims, 2 Drawing Sheets

AUTOMATIC SOLDERING MACHINE

BACKGROUND OF THE INVENTION

1. Field of the Invention

The present invention relates to an automatic spot soldering machine, and more particularly to an automatic soldering machine used for high volume assembly operations of components such as PC boards, electrical terminals, and the like.

2. Description of Related Art

Many attempts to develop general-purpose automatic spot soldering equipment have been made in the past, but these attempts have not been entirely successful. This is evidenced by the large number of types of machines and methods presently used such as induction, laser, resistance, open flame, hot air, molten solder, infrared, electrical resistance, and hot iron systems. Each method of heating the soldered parts and melting the solder and flux have advantages and serious disadvantages which exclude any specific type of machine for usage on a wide variety of parts.

The most prevalent systems-consist of a metal tip that is heated to a pre-selected high temperature by any convenient heat source such as an electrical resistance element.

Solders that are predominantly used typically melt at about 400° F. Non-corrosive fluxes activate at 400° F. to 600° F. and rapidly decompose at temperatures over 600° F.

The most convenient method of providing the solder and flux is in the form of a solder wire containing a core of rosin flux.

Solvents used in fluxes vaporize at about 200° F. and do so quite explosively at temperatures over 600° F. This splatters flux and solder particles adjacent to the tip. The solder tip temperature for fast and good saturation of parts is usually desired to be over 800° F.

In spite of good vacuum systems, the solder/flux sputter and condensation of the flux vapors collect on the mechanical components that are in close proximity to the solder tip. The condensed flux is tacky when warm and solid when cold. This adversely affects the motion of mechanical components.

At solder tip temperatures over 600° F., the solder coating on the metal tip periodically becomes removed, which seriously reduces the heat conduction and possibly produces defective parts. Recoating the tip with solder requires tip cleaning motion with a cleaning pad, which interrupts a production line sequence.

A typical cycle sequence for soldering consists of: 1) lower the hot solder iron on top of the part(s); 2) feed the solder wire point against the side of the hot solder tip, at the interface of the tip and part; 3) dwell in this position until the part(s) are heated to over 400° F., which allows the flux to react and the molten solder to saturate the part(s); and 4) remove the solder iron to the initial position.

Another typical sequence is to: 1) feed the solder wire out between the part(s) and solder tip; 2) lower the solder tip onto the solder wire; 3) melt the solder (and flux) and continue the tip motion to allow the tip to press against and heat the part(s); and 4) dwell and then release the solder iron.

SUMMARY OF THE INVENTION

The present invention is designed to provide a low cost, low maintenance, general-purpose machine, which also eliminates the problems involved with other systems.

The cycle sequence of the solder iron tip motion, tip temperatures, tip velocity, solder wire feed rates, and solder wire feed pressures are precisely controlled for each application with considerations including the part size, solder wire size, cycle speed, dwell time between parts, factory temperature variations, line voltage fluctuations, and material variations. These adjustments can only be optimized by an experienced person with access to proper tools and equipment.

One example according to the teachings of this invention provides a non-adjustable machine that is preset at the solder machine factory for a specific part.

A second example according to the teachings of this invention provides an automatic spot solder machine with adjustable controls limited to the solder wire feed length and cycle speed.

A third example according to the teachings of the present invention includes means to heat the tip from 500° F. to 700° F. within 0.75 seconds or less, including means to cool the tip from 700° F. to 500° F. within 1.5 seconds or less.

The rapid cooling and heating of the solder iron tip are required to maintain a reasonable high production rate, which also provide many variations of the basic cycle sequence. Also, the cool tip prevents the tip surface from oxiding and losing its solder coating when not in use. However, if some area of the tip loses its coating, a low temperature melting of the solder and flux allows the tip to become re-coated with solder. This eliminates the need for a tip "cleaning" cycle.

An exemplary cycle utilizing the teachings of the present invention can be: 1) the solder iron tip is normally at a temperature of 300° F. to 500° F. when idle; 2) feed the solder wire out to position the front section between the tip and part(s); 3) simultaneously lower the tip onto the solder wire and heat the tip to a temperature of 400° F. to 600° F.; 4) melt the solder wire and flux at this low temperature, which reduces or eliminates splatter of flux and solder; 5) increase the tip temperature to 600° F. to 1200° F., for a rapid saturation of solder into the part(s); and 6) return the tip to its original position and simultaneously allow the tip to cool to a temperature of 300° F. to 500° F. in time for the next cycle.

Another exemplary cycle utilizing the teachings of the present invention can be: 1) the solder iron tip is normally at a temperature of 300° F. to 500° F. when idle; 2) lower the tip onto the part(s) and simultaneously heat the tip to a temperature of 500° F. to 700° F.; 3) feed the solder wire/flux into a hole on the side of the solder tip, where a connecting hole on the bottom surface of the tip allows the molten solder and flux to exit the tip and onto the part(s) (see FIG. 3); 4) increase the tip temperature to 600° F. to 1200° F., for a rapid saturation of solder into the part(s); and 5) return the tip to its original position and simultaneously allow the tip to cool to a temperature of 300° F. to 500° F. in time for the next cycle.

A fourth example according to the teachings of the present invention includes a solder iron tip with a cross hole for feeding the solder wire into the hole. This allows the solder/flux to melt within the solder tip, which eliminates all splatter of flux and solder. Exiting the molten solder/flux through a hole at the bottom of the tip places the solder/flux exactly where the part(s) are located. (See FIG. 3).

The objectives in feeding the wire through the tip include: 1) prevent splatter of flux and solder; 2) deposit the solder/flux precisely; 3) reduce the decomposition of the flux by reducing the area and contact time of the flux on the hot solder tip, which also improves the solder saturation into the parts and assists in maintaining a coated solder tip; and 4) create a high-pressure extrusion of the molten solder/flux out of the solder tip, onto the part(s).

Many previous attempts by others and this inventor to provide a solder wire feed through a hole in the solder tip were unsuccessful. Large diameter solder/flux wire over 0.125 inches, which is seldom used in high production, is relatively easy to process by this method. Smaller diameters are possible only with a precise design and control of many inter-related variables.

These variables are: temperature of the solder tip; diameter and feed rate of the solder wire; diameter, length, and thermal conductivity of the solder tip; size and length of the entrance hole; cycle speed; and timing. It is desired to feed the solder wire through the hole without any blowback. The entrance hole may be larger or smaller than the solder wire diameter. If the hole is smaller than the wire, the wire may be pushed in with a high force and high speed, which shaves or melts the outside surface of the wire. If the tip temperature is hot enough, the wire surface can be melted at any reasonable speed. If the feed rate is too slow for any given temperature, the outside surface of the wire melts to a depth, which allows blowback (See FIG. 4).

If the diameter of the hole is larger than the wire diameter, which is the more practical method to control the other parameters, then the sealing of the space between the wire and hole wall is made by the solidification of molten solder. The liquid solder blows back into the space, which rapidly cools when in contact with the inwardly moving wire. This effectively increases the wire diameter to the dimension of the hole, leaving no space for a blowback (See FIG. 5). In this configuration, the length of the hole becomes a significant factor. If the length of the hole is very short, then the solder/flux blows out before it has a chance to cool, even if the hole clearance is very small. If the hole length is very long, then the hole size may be very much larger than the wire size, especially if the hole is a long tube with a cold (less than the melting temperature of the wire) entrance opening, in which case the feed rate may be fast or very slow (See FIG. 6).

In all configurations, the maximum feed speed is limited to the speed at which the wire point melts. The melting speed is a function of the wire diameter, length of the hole, tip temperature, feed pressure and the thermal conductivity between the hole and the wire surface.

Another design variation, which decreases the criticality of the temperature, feed rate, hole size, and length is to plate the hole wall with a non-solderable material such as chromium plating or ceramic. The non-solderable surface will substantially reduce the thermal conductivity. This requires a hole larger than the solder wire diameter. If the other design parameters are such that a slight blowback occurs, then the flux decomposes and the residue adheres to the wall of the hole, which reduces the diameter of the hole. Also, the non-solderable hole wall is a poor heat conductor. Therefore, the incoming cold solder wire quickly solidifies the outward moving solder/flux.

A fifth example according to the teachings of the present invention includes a solder wire feeder and an accurate wire guide mechanism. The solder wire is ductile with a low beam strength, cold flows, not always straight and free of kinks and quite often becomes coated with flux. Also, the guide and feeder mechanism require accommodation for heat and flux contamination. One disclosed example consists of a rigid guide rail, which is open on the top surface, in the form of a groove. The solder wire nests within the groove and is held down with a spring, which is positioned close to the end of the rail. The spring maintains a pressure against the wire, which keeps the wire straight and deflects whenever irregularities on the wire feed through (See FIG. 2).

To prevent buckling of the free end of the wire, between the end of the rigid rail and solder tip, the end of the rigid rail is positioned within 16 diameters of the solder tip. It is anticipated that this rail could extend up to the solder tip or, if fabricated out of a low heat conductive material such as ceramic, it could be an integral part of the solder tip (See FIG. 6). All disclosed designs require the feeder mechanism to be small to provide access of the solder tip to various parts which are soldered, be tolerant to contamination from flux and solder particles, and have a low inertia to minimize the forces required for a rapid feed and pull back of the wire. Also, the infeed of the solder wire is occasionally obstructed or encounters a hesitation. This requires that the feeder apply a forward force on the wire that is as high as possible but less than the buckling force of the wire.

The high solder wire feed force, combined with a good seal between the solder wire and the in-feed hole on the solder tip, creates a high out-flow pressure of the molten solder. The solder wire feeding into the hole acts like a piston.

The disclosed machine includes a cam actuated feed finger consisting of a lever with a small point which imbeds and engages the solder wire. The configuration of the point and the depth of penetration determine the forward force that is applied by the lever onto the wire. If an obstruction prevents the wire from feeding forward at the velocity of the feed finger, the point cuts a path in the top surface of the wire, which imparts a predetermined, maximum, constant forward force on the wire (See FIG. 2). The constant force on the wire is imparted to the wire at the point of engagement. Therefore, all feed mechanism inertia forces are eliminated. It is anticipated that other more complicated methods of applying a constant force are possible many with compromises on the basic requirements.

The disclosed machines provide a relatively constant force, and are relatively simple in construction, contamination tolerant, small profile, and low cost.

The feed finger is actuated by a cam motion, which provides a simple, high force, high velocity drive system for the feeder, which is always in exact timing with the tip motions.

The combination of the high force, high velocity, and close fitting guide rail causes the soft, gummy solder wire to gall (stick) within the guide groove. A very light coating of oil is required on the solder wire. Most solder wire manufacturers do not provide lubricated wire.

A sixth example according to the teachings of this invention includes an oil pouch having a rectangular piece of open cell neoprene, vacuum filled with oil, and sealed in a plastic bag, which provides a clean method of handling this item (See FIG. 1, reference number 17). It is installed into the machine system by piercing the solder wire through the plastic and foam. This item costs on the order of one dollar and replaces a previous oiler and wiper system that cost approximately one-thousand five-hundred dollars. A seventh example according to the teachings of the present invention includes a means to electrically heat the tip with a low voltage and amperage greater than 300 amps, at 10 to 100 Hz. The high amperage alternating current creates an electrical/magnetic field in the molten solder, tip, and parts, which vigorously vibrates the molten solder. This improves the saturation of the solder into the parts. The input power of 60 Hz AC is ideal for this function.

The high amperage AC also repels molten solder from the solder tip. Therefore, a short burst of high current at the instant when the tip is removed from the part repels most of the excess solder that normally adheres to the tip. This action eliminates a sharp residual point of solder (known as an icicle) from forming on the surface of the part. Another advantage of this repulsion effect is to eliminate any splash of solder balls during the tip retraction. When the tip separates from the part, the molten solder strings out into a bridge between the tip and part. When the string breaks, a section of the string sometimes breaks away into a small ball and flings out. The repulsion effect of the solder tip eliminates any bridging effects.

An eighth example according to the teachings of the present invention includes a solder cycle wherein a short pulse of alternating current is applied to the solder tip simultaneously with the upward motion of the solder tip.

A ninth example according to the teachings of this invention consists of a solder tip holder, which is required to be moveable, stiff, precision, and tolerant to contamination. These requirements are provided for by placing the solder tip holder on a support bracket, which is then pivot mounted on pre-loaded ball bearings. The pivot bearings are located at some distance away from the solder tip (See FIG. 1, reference number 14).

A tenth example according to the teachings of the present invention includes a cam drive, which powers substantially all of the mechanical motions (See FIG. 1, reference number 12).

BRIEF DESCRIPTION OF THE DRAWINGS

Reference is made to the accompanying drawings in which.

DESCRIPTION OF THE PREFERRED EMBODIMENT

Figure 1:
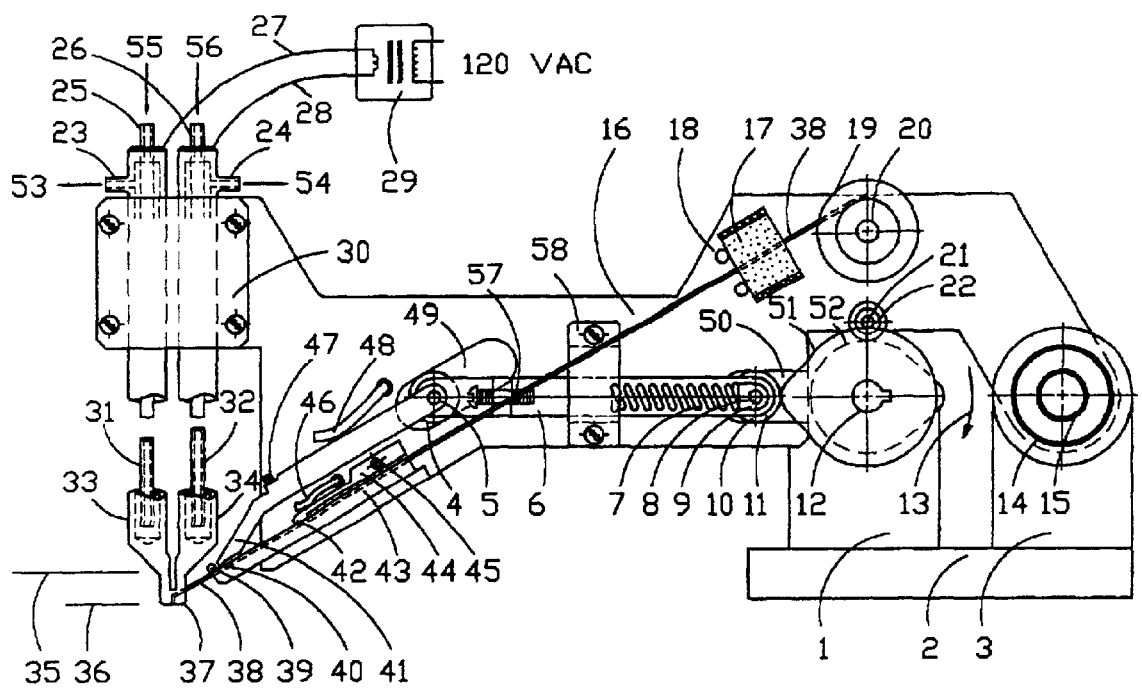
FIG. 1 is an illustration of the preferred embodiment of the present invention. Several items that are not illustrated are a computerized machine controller commonly known as a PLC (Programmable Logic Controller), a cam shaft actuator, which may be a conventional stepper motor, electric motor, air motor, servo motor or any other one revolution actuator, and a transformer controller, which is a conventional PLC controlled triac system.

Referring to FIG. 1, a pivot plate 16 is bolted on to a shaft 15, which is supported by preloaded ball bearings 14. The plate 16 provides means to support a solder tip holder 30, a wire feed mechanism, a spool of solder wire 19 on a shaft 20, and a cam follower bearing 22. The stationary base plate 2 supports a camshaft 12, gear box 1 and pivot bearing support 3. Two cams 51 and 52, which are mounted on the shaft 12, provide the solder feed and spindle up/down motions.

FIG. 1 illustrates the solder tip 37 in the down (soldering) position and the feed finger 41 in the fully extended position.

Coolant water flows into tubes 55 and 56 through nipples 25 and 26, circulates through the lower extensions 31 and 32 of the tubes to the bottom end of the solder tip shanks 33 and 34, upwards around the extensions 31 and 32, and exits out through tubes 53 and 54 in side nipples 23 and 24. The solder tip shanks 33 and 34 are bolted on to an insulator block 30, which in turn is rigidly mounted on to the pivot plate 16.

Wires 27 and 28 provide a low voltage, high current power for the solder tip 37. A step down, isolation transformer 29, contains primary windings, which are energized by a PLC controlled triac (not illustrated) with a 120 VAC power input.

An oil pouch 17, which consists of oil filled neoprene sponge covered with a sealed plastic bag, provides an extremely light coating of oil on the solder wire 38. The pouch is installed into the operating system by piercing the solder wire 38 through the plastic bag and sponge 17. Two pins 18 restrain the pouch from moving along with the solder wire. A down and up motion of the solder tip is required for each soldering cycle. This motion is provided by the rotation of the cam 52, which rotates in the direction indicated by the arrow 13. A cam follower bearing 22 rotates on a pin 21, which is rigidly press fitted into mounting plate 16.

The solder wire feed is precisely controlled by the configuration of the peripheral surface of cam 51. Various requirements of the feed timing, with respect to the solder tip position, feed rate and feed length, can be accommodated by varying the cam shape. An adjustment screw 57 may also be used to reduce the feed length. The feed actuator lever 6 is moveably held in position against plate 16 with a slotted bracket 58. One end of this lever 6 contains a cross pin 8. Inserted on this pin 8 are two cam follower bearings 10 and 11, and a spring guide 9. One bearing 10 oscillates in groove 50 and the other bearing 11 is positioned to follow the cam 51 surface. Spring 7 maintains a constant return force on lever 6. The other end of lever 6 contains another press fitted cross pin 5. A cam follower bearing 4 is rotationally placed over this pin 5 and fitted into a groove 45, which allows a guided motion of this end of the lever 6. This geometry transfers the cam 51 motion to the proper feeder motion of feed finger 41, which is pivotally mounted on one end onto pin 5.

The other end of feed finger 41 contains a sharp point 40, which imbeds into and engages the solder wire 38. A spring 48 applies a strong engagement pressure. A pin 47 is rigidly press fitted into plate 16. This pin engages the finger 41 only on the final short movement of the feed motion.

A lever 44 pivotally mounted over pin 45, which is rigidly press fitted into plate 16, contains a lower curved surface 42 which presses against the solder wire 18. The pressure is provided by a spring 46. This mechanism provides a calibrated friction force on the solder wire.

Figure 2:
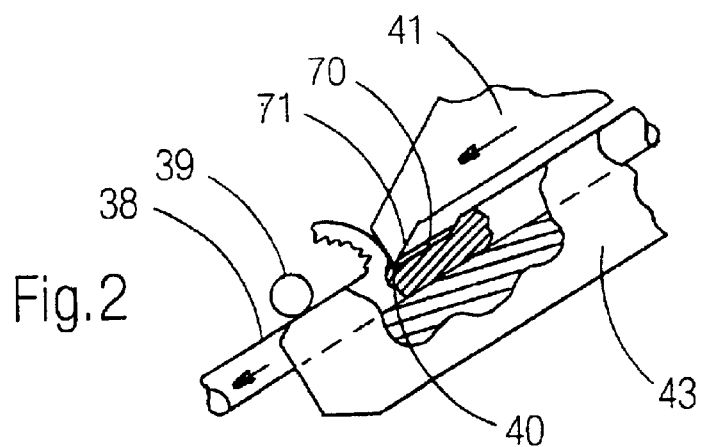
FIG. 2 is an enlarged cross section of the solder wire, rail, and feed finger, which illustrates the shaving motion of the point on the wire, during a momentary wire jam.

The sharp point 40 on the end of finger 41 is configured as illustrated in FIG. 2. The back surface 71 of this point is angled approximately 35° to the solder wire 38. On a soldering cycle, it is desired to feed out a specified length of solder, melt the point, and then quickly retract the melted end away from the hot solder tip. To obtain the retract motion, pin 47 is positioned to prevent the sharp point 40 from disengaging the contact with the wire 38. The retract motion of finger 41 imparts sufficient force on the wire 38 to overcome the friction force created by lever 44. When the retract motion of finger 41 disengages contact of the top surface of finger 41 to pin 47, the sharp point 40 of finger 41 is free to deflect away from the solder wire 38, due to the ramp angle 71. The wire 38 is then held in a stationary position by lever 44.

The finger 41 continues to retract to a position which determines the feed length for the next cycle.

A spring 39, FIG. 2, holds the solder wire within the groove on the wire guide rail 43. The solder tip element consists of two shanks 33 and 34 which are designed to be water cooled and low electrical resistant. The solder tip section 35 to 36 consists of a substantially smaller cross section, which is configured to absorb a significant proportion of the $I^2R$ energy, which is provided by the high current.

The solder tip is required to rapidly heat and cool; therefore, the thermal conductivity of the tip section 35 and 36 is maximized for a rapid cooling of the tip section 37, when the electrical current is turned off. However, when the current is turned on, the tip 37 is required to rapidly heat up to a high temperature. A compromise design is required to accommodate these two directly opposing requirements. Factors to consider are: the power input available, electrical resistance, thermal conductivity and specific heat of the tip material, the specific heat (DT and heat of fusion) of the solder, specific heat of the part(s) required to be soldered, the cycle speed required and the varying cross sections of the tip area.

In general, the net effect of these design details must be a tip surface that cools at a rate of 700° F. to 500° F. within 1.5 seconds or less and heat up at a rate of 500° F. to 700° F. within 0.75 seconds or less.

Referring now to FIG. 2, the solder wire 38 may become partially or momentarily jammed during a feed cycle. If and when this occurs, it is desired to maintain a constant forward force on the wire, as high as possible, but not great enough to buckle or compress the wire 38. The finger tip 40 is configured and adjusted for the proper depth to provide a calibrated maximum and constant force on the wire, by absorbing the differential motion between the tip 40 and wire 38 by shaving a groove 70 in the solder wire.

Figure 3:
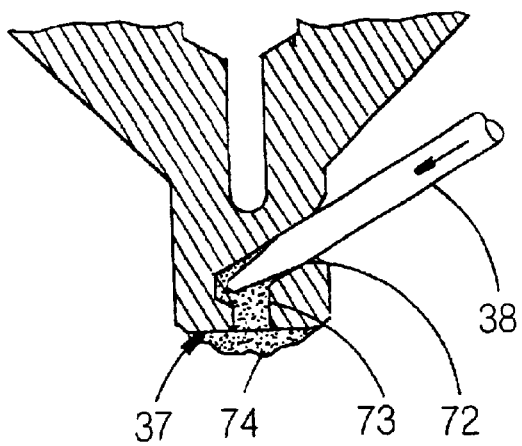
FIGS. 3, 4, 5 and 6 are enlarged cross sections which illustrates various details of the solder tip.

The tip assembly 33, 34, and 37 illustrates an approximately is proportioned diagram of one useable design. It is anticipated that an endless number of variations of the tip design, materials and methods of cooling are possible. FIG. 3 is an enlarged cross section of a solder tip, which illustrates the solder wire 38 being fed into the chamfered hole 72. The molten solder and flux 74 is pushed out through a connecting hole 73, which is normally positioned over a part required to be soldered. The shaded areas around the surfaces of the solder wire 38 illustrate the molten solder.

Figure 4:
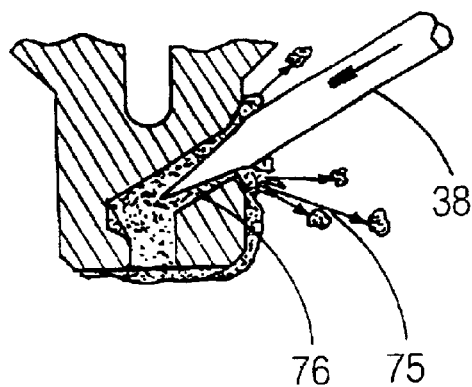

FIG. 4 illustrates a blow back 75 of the molten solder/flux which occurs if the solder wire feed rate is too slow for the tip temperature and clearance between the hole 76 and solder wire 38.

Figure 5:
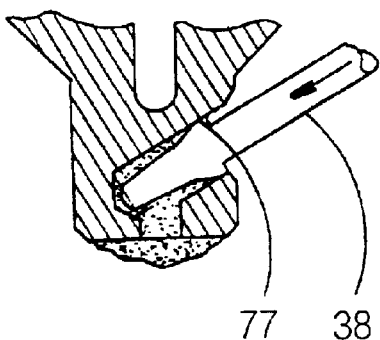

FIG. 5 illustrates the bulge 77 and increase of the solder wire 38 diameter created by the solidification of the molten solder/flux when in contact with the cold inwardly moving wire 38. The increase in diameter of the wire effectively seals the hole clearance.

Figure 6:
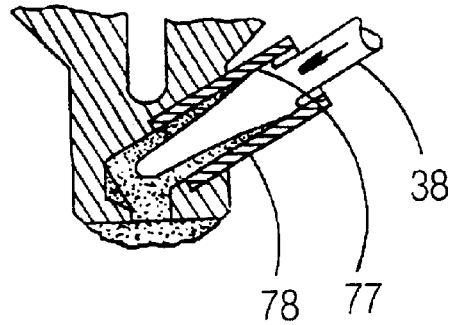

FIG. 6 illustrates a solder tip 37 fitted with a tube 78 constructed from a low thermal conductivity material such as ceramic. This design substantially reduces the criticalness of the hole clearance and wire feed rate.

What is claimed is:

1. An automatic soldering machine comprising:
   a heater to provide heat to a quantity of solder wire and to parts in a soldering position for soldering;
   means to move said heater and solder wire into the soldering position; and
   an oil pouch for applying a coat of oil on the solder wire, said oil pouch comprising:
      an oil filled, open pore sponge elastomer contained within a sealed plastic bag, wherein the pouch is positioned in the path of and is pierced by said solder wire to allow the solder wire to pass through the bag and sponge.

2. Apparatus according to claim 1, further comprising: various adjustments which may be controlled by a machine operator, a production setup person, or a computer.

3. An apparatus for soldering comprising:
   a heater to provide heat to a quantity of solder wire and to parts in a soldering position for soldering;
   means to move said heater and solder wire into the soldering position;
   a solder wire feeder having a rigid guide rail with an axial groove for nesting and guiding solder wire, and
   an oscillating bar positioned over the rail which supports a sharp point for engaging the solder wire as required for a forward feed motion.

4. An apparatus for soldering comprising:
   a solder wire feeder having a rigid guide rail with an axial groove for nesting and guiding solder wire; and
   an oscillating bar positioned over the rail which supports a sharp point for engaging the solder wire as required for a forward feed motion;
   said rigid guide rail having a front end positioned within about 16 diameters of a solder wire diameter from the solder tip, and wherein the front end of the guide rail contains a biasing device which holds the solder wire within the groove.

5. An apparatus for soldering comprising:
   a heated solder tip wherein said solder tip is at a relatively constant temperature and has one or more holes to receive a portion of solder wire that is about 0.125 inches in diameter or less angularly positioned within the tip, and has one or more intersecting holes to allow exit of molten solder onto a part to be soldered,
   a solder wire feeder acting to feed the solder wire into the tip through the angular holes, in which said solder wire feeder includes a rigid guide rail with an axial groove for nesting and guiding solder wire, and an oscillating bar positioned over the rail which supports a sharp point for engaging the solder wire as required for forward feed motion; and
   wherein the one or more holes are of a properly designed shape, dimension, material, temperature, a controlled solder wire feed rate, and force to prevent molten solder and/or flux from ejecting out of an entrance of the one or more holes.

6. Apparatus according to claim 5, in which the angular passage in the solder tip is provided with a tube extension of a low thermal conductivity material.

7. An apparatus for soldering comprising:
   a heated solder tip wherein said solder tip is at a relatively constant temperature and has one or more holes angularly positioned within the tip to receive a portion of solder wire and one or more intersecting holes to allow exit of molten solder onto a part to be soldered,
   a solder wire feeder acting to feed the solder wire into the tip through the angular holes, wherein the one or more holes are of a properly designed shape, dimension, material, temperature, a controlled solder wire fee rate, and force to prevent molten solder and/or flux from ejecting out of an entrance of the one or more holes; and
   an oil pouch for applying a coat of oil on the solder wire, the pouch comprising an oil filled, open pore sponge elastomer contained within a sealed plastic bag, the bag being positioned in line with the and pierced by the solder wire to pass through the bag and sponge.

8. Apparatus according to claim 7, including mechanisms for moving the solder wire actuated by cams.

9. Apparatus according to claim 8, including means to periodically position the tip for a soldering operation, and means to heat the metal tip to temperature in the range of about 500 F to 700 F at a rate of 0.75 seconds or less and cooling the tip to temperatures in the range of about 700 F to 500 F at a rate of about 1.5 seconds.

* * * * *